United States Patent [19]
Gruner et al.

[11] Patent Number: 6,136,445
[45] Date of Patent: *Oct. 24, 2000

[54] POLYMER SHEET COATED WITH LACQUER AND A METHOD OF APPLYING THE COATED POLYMER SHEET TO MOULDED BODIES

[75] Inventors: Christian Gruner, Hürth; Reinhart Schmitt, Bornheim; Hans-Peter Patzschke, Wuppertal, all of Germany

[73] Assignee: Herberts Gesellschaft mit Beschrankter Haftung, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/682,042

[22] Filed: Jul. 16, 1996

[30] Foreign Application Priority Data

Jul. 20, 1995 [DE] Germany ............................ 195 26 478

[51] Int. Cl.⁷ ..................................................... B32B 27/40
[52] U.S. Cl. ...................... 428/423.1; 156/230; 156/285; 264/328.1; 428/524
[58] Field of Search ..................................... 525/456, 509, 525/455, 127; 524/589, 441, 449; 428/423.1, 500, 523, 524; 156/230, 285; 264/328.1

[56] References Cited

U.S. PATENT DOCUMENTS

| | | | |
|---|---|---|---|
| 4,948,829 | 8/1990 | Mitsuji et al. | 524/457 |
| 4,957,802 | 9/1990 | Mentzer et al. | 428/174 |
| 5,314,945 | 5/1994 | Nickle et al. | 524/507 |
| 5,552,496 | 9/1996 | Vogt-Birnbrich et al. | 525/440 |

FOREIGN PATENT DOCUMENTS

| | | |
|---|---|---|
| 0 251 546 A3 | 1/1988 | European Pat. Off. . |
| 0 422 357 | 4/1991 | European Pat. Off. . |
| 251 546 | 3/1992 | European Pat. Off. . |
| 261 815 | 3/1992 | European Pat. Off. . |
| 352 298 | 11/1993 | European Pat. Off. . |
| 441 888 | 1/1994 | European Pat. Off. . |
| 0 584 818 | 3/1994 | European Pat. Off. . |
| 39 15 459 A1 | 11/1989 | Germany . |
| 40 25 264 | 2/1992 | Germany . |
| 43 28 092 A1 | 2/1995 | Germany . |

*Primary Examiner*—D. S. Nakarani
*Attorney, Agent, or Firm*—Schwegman, Lundberg, Woessner & Kluth, P.A.

[57] ABSTRACT

The invention is directed to a lacquer coating for polymer sheet and a method for applying the coated polymer sheet to a molded body. The lacquer contains a binder, a metal pigment, a color pigment, organic solvent in water wherein the binder includes a combination of hard and flexible resins. The ratio of these resin is adjusted so that the elastic-plastic behavior of the lacquer coating matches that of the plastic polymer sheet. In this fashion, the coated sheet can be deformed without causing substantial blistering or cracking of the coating on the polymer sheet.

7 Claims, No Drawings

POLYMER SHEET COATED WITH LACQUER AND A METHOD OF APPLYING THE COATED POLYMER SHEET TO MOULDED BODIES

FIELD OF THE INVENTION

This invention relates to a polymer sheet which has been coated with a lacquer which contains binder vehicle, effect pigment, organic solvent and water, and to a method of applying the coated polymer sheet to molded bodies.

BACKGROUND OF THE INVENTION

Moldings based on plastics, which are to be used together with metal parts and which require a coating, are increasingly being employed in the automobile industry. Plastics moldings of this type consist of polypropylene or other thermoplastics or temperature setting plastics and can be coated with plain colors and effect colors with or without pretreatment. It is also possible for plastics parts not to be directly coated with lacquers but to be clad with lacquer-coated backing sheets. The coated backing sheets are applied to the motor vehicle parts by deformation with the application of heat and/or vacuum.

Processes of this type for the manufacture of interior parts of motor vehicles are already in use. When effect lacquer systems which are customary for motor vehicle bodywork are used in the outer colors, this results in visual defects in the uniformity of the effect coating and in cracks when it is subjected to dilatation, and these fissures continue in the sheet used, with tearing of the same. This can be circumvented by heating the coated sheet to high temperatures, where 145° C. is quoted as the minimum temperature, whereby the lacquer film becomes sufficiently flowable at the time of deformation. These processes are described in EP-A-0 251 546 96B1 and EP-A-0 261 815 B1, wherein polyester or polyurethane sheets are used as the sheet, a commercially available solvent lacquer (Durethane 101 PPG Industries) is used as the lacquer, and a commercially available acrylic adhesive is used as the adhesive. It is disadvantageous that during the flow processes which are utilised the position of lamellar effect pigments in relation to each other and their geometric alignment within the effect lacquer coat alter in such a way that the uniform appearance of the effect lacquer coat is impaired, whilst no defects occur for solid colour lacquers. Moreover, on account of the high temperatures many polymers of interest cannot be used as sheet materials, since the optimum temperature range for forming processes, with the maximum elongation at tear for thermoplastics or the crystallite melting range for partially crystalline polymers, has already been exceeded. The high deformation temperatures also make the deformation process susceptible to defects at different temperatures within the production range.

EP-A-0 441 888 claims a process in which dual effect lacquer coats comprising effect pigments of different sizes are applied to polymer backing sheets, wherein these coats together produce effect coatings which are particularly attractive visually. Sheets for thermal deformation can be coated using this system if the melting temperature of the lamellar effect pigments is around 5° C. to 50° C. higher than the temperature of thermal deformation. Therefore, high deformation temperatures are necessary, or low-melting effect pigments have to be used. Moreover, two coats of lacquers containing effect pigments have to be applied.

One fundamental problem is that during the plastic flow processes which occur on deformation, the positioning of the effect pigments is altered in an irregular manner corresponding to the flow of the sheet material, and the uniform appearance of the deformed sheet is thus impaired and visual defects such as streak-like phenomena occur. However, even tests with elastomeric thin film substrates have shown that cracking and detachment of applied coatings occur during deformations, and thus effect-coated moldings cannot be produced.

EP-A-0 352 298 B1 describes a process in which fluoropolymers are used as binder vehicles for lacquers for coating sheets which are first thermally deformed into their final geometry and are subsequently back-filled, on their back face, with plastic molding material in an injection molding process. A disadvantage here is that two operations are necessary in order to deform the sheet and to anchor it on the supporting plastic material, and that fluoropolymers are expensive and problematical materials.

SUMMARY OF THE INVENTION

The object of the present invention is to provide a polymer sheet coated with effect pigmented lacquer, which can subsequently be deformed. The lacquer should adhere well to the sheet, should facilitate a good flop effect, and should permit dilatation of the sheet coated with it without damaging or impairing the appearance of the lacquer, even when the coated sheet is strongly dilated.

It has surprisingly been found that the aforementioned objects can be achieved by means of a polymer sheet which is coated with a lacquer which contains a binder vehicle combination based on an elastic polyurethane resin and a hard melamine resin, and the elastic-plastic behaviour of which can be matched to the properties of the polymer sheet to be coated by varying the ratio of the said binder vehicle components.

DETAILED DESCRIPTION OF THE INVENTION

The present invention therefore relates to a polymer sheet of the type cited at the outset, which is characterised in that the lacquer contains 18 to 45% by weight of a binder vehicle combination,
0.1 to 10% by weight of lamellar aluminium- and/or mica effect pigment,
0 to 15% by weight of colouring pigment,
3 to 20% by weight of organic solvent, and
50 to 76.9% by weight of water,
wherein the sum of the constituents is 100% by weight and wherein the binder vehicle combination contains
A) 10 to 70% by weight of polyurethane resin,
B) 5 to 40% by weight of melamine resin,
C) 0 to 60% by weight of further binder vehicles, and
D) 0 to 6% by weight of thickener,
wherein the sum of components A) to D) is 100% by weight.

The thickener is advantageously an acrylic resin or polyvinyl alcohol thickener, and the content of thickener in the binder vehicle combination is advantageously 0.1 to 3% by weight.

The lacquer may contain further customary additives, provided that these do not impair its use for polymer sheets which are subsequently to be deformed.

The dry film thickness of the lacquer coat is advantageously 8 to 25 μm, wherein an additional clear lacquer with a dry film thickness of 20 to 50 μm is generally applied.

The present invention also relates to methods of applying the coated sheet to plastics molded bodies. The sheet may be adhesively bonded to the molded body by means of an adhesive, either manually or in a vacuum forming process. It is also possible to back-fill the polymer sheet with a plastic molding material using a mold. The application of an adhesive is generally not necessary in this case.

Depending on the sheet to be coated, and thus depending on the requisite elastic-plastic behaviour, the base lacquer can be formulated by varying the ratio of the elastic binder vehicle component A and the hard component B and optionally C within the given ranges. This can be effected by testing formulations with different mixture ratios of components A) and B) to determine whether the lacquer structure produced with them, in combination with the sheet to be coated, exhibits 20 to 55% elastic deformation and 80 to 45% plastic deformation in a test according to DIN-ISO 1520 at 21° C. to 23° C. This is to be understood as meaning that on a deformation of depth 10 mm and subsequent release of the loading a deformation of 4.5 to 8 mm remains without cracks having being formed, and thus 20 to 55% of the deformation was of an elastic character. In this respect, it should be remarked that the said criteria are applicable to deformation at room temperature and thus enable the lacquer and the sheet to be matched in a simple manner. Higher proportions of plastic deformation may occur when the method is applied, due to the higher forming temperatures.

It is an essential feature of the present invention that, by means of the quantitative ratio of components A, B and C, the hardness and the elasticity of the lacquer can be matched to the sheet to be used so that the final coated sheet exhibits the aforementioned values of elastic and plastic deformation. With the aid of the cupping test described above, it can easily be ascertained whether the lacquer is suitable for coating the sheet concerned.

The base lacquer is optionally coated with a clear lacquer, and the coated sheet is subsequently applied to the plastic substrate by deformation with the application of heat and/or vacuum, wherein dilatations of more than 10% and/or bends around bending radii of 300 mm or less can occur.

The water-thinnable polyurethane resin component is produced from a prepolymer containing isocyanate, which is converted into an aqueous phase after neutralisation with tertiary amines, and the chains of which can then be lengthened immediately with water, polyols, polyamines or polyhydrazines. The NCO prepolymer is formed by the reaction of a. a linear polyether and/or polyester diol with a molecular weight of 600 to 6000,
b. low molecular weight compounds which contain two groups which are reactive with isocyanates, wherein at least part of these groups comprises a group capable of forming anions, and
c. optionally small proportions of polyols containing more than two hydroxyl groups,
with diisocyanates.

In this respect, the reaction of the NCO prepolymer is effected so that 1.01 to 1.5 equivalents of NCO groups are allotted to 1 equivalent of OH groups The molecular weight of the chain-lengthened polyurethane dispersion is between Mn 50,000 to 150,000, as measured by gel permeation chromatography by comparison with a styrene standard. The reaction of components a, b and c is effected by the well-known methods of polyurethane chemistry, wherein the reaction may be effected either in the mixture or step-wise.

The compounds which are customary in polyurethane chemistry can be used as polyether and/or polyester diols.

Compounds which can be used which comprise anionic groups or groups which can be converted into anions and which contain groups which are reactive with isocyanates such as OH, SH and $NH_2$ include those with acidic groups which are suitable for the formation of ions, such as carboxyl, phosphonic acid and sulphonic acid groups. Examples of compounds of this type include dimethylol alkyl monocarboxylic acids, such as dimethylolpropionic acid and dimethylolbutyric acid, for example.

Any organic polyisocyanates can be used as the isocyanate for the production of the polyurethane, particularly diisocyanates, and optionally mixtures also. In this respect, the customary diisocyanates which are known in the lacquer industry can be used. Suitable diisocyanates include aliphatic, araliphatic and aromatic diisocyanates, such as toluene diisocyanate, tetramethylxylylene diisocyanate, isophorone diisocyanate or hexane diisocyanate, for example.

The reaction may be conducted in the absence of solvent, but is preferably conducted in solvents which are inert to NCO groups and which are miscible with water. Solvents are advantageously used which in addition to the properties described above are also good solvents for dimethylolpropionic acid and for the polyurethanes produced, and which can easily be separated from aqueous mixtures. Acetone and methyl ethyl ketone, and also N-methylpyrrolidone, are solvents which are particularly suitable. Apart from these methods which are usually employed for producing polyurethane dispersions, other process variants are also possible, e.g. chain lengthening with polyols or water in the organic phase, neutralisation of the polyurethane binder vehicle which contains OH groups, dispersion in water and distilling off the organic solvent. If the reaction of a, b and c is effected at an equivalent ratio of 1.01 to 1.5 equivalents of OH to 1 equivalent of NCO, prepolymers which contain OH groups are formed, the chains of which can be lengthened with polyisocyanates in the organic phase or in aqueous emulsion. If unsaturated double bonds are incorporated in the polyurethane dispersion, the latter can be copolymerised with acrylic or methacrylic acid esters of different chain lengths, or with styrene also, in the aqueous phase. Acrylated polyurethane dispersions are produced in this manner.

After producing the aqueous polyurethane dispersion by known methods, further components, such as additional binder vehicles, effect pigments and additives, as well as organic solvents and water, are added to them in order to produce the metal effect base lacquer.

The additional binder vehicles may comprise water-thinnable polyester resins, polyacrylic resins, acrylated polyester or polyurethane resins, and melamine resins in particular.

Aluminium bronze and mica pigments may be used as effect pigments. The amount thereof is between 0.1 and 10% by weight with respect to the lacquer. The effect pigments may also be used together with one or more further, non-metallic pigments or colorants.

Suitable coloring pigments are customary organic and/or inorganic transparent or covering pigments, such as those which are described in German Standard DIN 55 944, for example. Examples of these include phthalocyanines, indanthrenes, thioindigo pigments, carbon black, titanium dioxide, iron oxide, and optionally extenders also, such as hydrated silica, french chalk or layer silicates.

The lacquer may also contain lacquer technology additives, for example rheology-influencing agents, such as microdispersed hydrated silica, layer silicates or polymeric urea compounds, and may also contain thickeners, such as cellulose ethers or esters, for example. Anti-settling agents, spreading agents, light stabilisers, anti-foaming agents and wetting agents may also be used. Acidic, basic and/or metallic catalysts may also optionally be used for accelerated hardening.

The usual lacquer technology solvents are suitable as solvents. These may originate from the production of the binder vehicles or can be added separately. Examples include alcohols, glycol ethers, ketones and/or aromatic or aliphatic hydrocarbons.

The lacquer according to the invention is produced by known methods which are described in the literature. In particular, the binder vehicles used are suitable for the production of aqueous effect base lacquers for the coating of sheets for plastic moulded bodies. In this connection, the lacquer according to the invention is applied to the sheet by spraying, particularly by atomisation by means of rotational forces and/or compressed air. Thereafter, the films are dried in air or by heat with the removal of the volatile constituents.

The effect base lacquer which is applied to the backing sheet may be coated with a clear lacquer. The latter may be based on a polyester condensate, for example. The clear lacquer may contain small amounts of UV absorbers, for example 0.1 to 2% by weight. The commercial product TINUVIN 328 a registered trademark (Ciba-Geigy) a hindered amine light stabilizer is an example of a UV absorber.

Before the application of the effect base lacquer according to the invention, the backing sheet may be pretreated by the usual pretreatment methods for the coating of plastics. The so-called corona discharge method is preferably used for this purpose. In addition, coating with commercially available, elastic, single-component or two-component primers can be effected before the application of the effect base lacquer according to the invention. These are compounds which are based on chlorinated polyolefin, for example.

The backing sheet consists of a thin, semi-elastic material which is suitable for the thermal deformation process and which has suitable dilatation properties, e.g. the commercial products HOSTAPROP or HIFAX CA registered trademark for 10A (commercial products manufactured by Hoechst AG/Frankfurt and Montell GmbH/Bayreuth, respectively the HOSTAPROP product is a polypropylene laminate film and the HIFAXCA product is a polypropylene plastic). The backing sheet preferably consists of a completely or partially thermoplastic olefinic material which is produced by the polymerisation of olefins such as ethylene, propylene, butadiene and the like. However, other polymer sheets such as polyester sheets may also be used, provided that, in the composite system with the lacquer, they fulfil the criterion cited in the description of the lacquer system. Sheets of this type should preferably exhibit proportions of about 30 to 40% elastic deformation and 60 to 70% plastic deformation at a test temperature of 21° C. At higher deformation temperatures it is particularly advantageous if the polymeric sheet contains partially crosslinked elastomeric fractions. Partially crosslinked ethylene-propylene rubbers, which optionally also contain butadiene fractions, are materials such as these.

The backing sheet may optionally comprise further sheet layers. The thickness of the material is selected so that it is suitable for thermal deformation into a three-dimensional shape. Thus its thickness may be 0.1 mm to 0.7 mm, for example. The coated sheet may be applied as a covering round the plastic moulded body, with the application of heat and/or vacuum, by all generally known methods. The deformation techniques which are suitable correspond to the known prior art, wherein deformation may be effected either by differences in air pressure or by dies, and the molding which is to be coated with the sheet may itself be used as the die or mold. The sheet is preferably heated with circulating air, infrared radiation or by other media before its deformation. However, for geometries which are not too pronouncedly three-dimensional it is also possible to employ cold stretching, wherein reversion processes due to a lack of plastic behaviour must be prevented by simultaneously putting on the molding, however. Amongst other factors, the deformation temperature depends on the nature of the coating material.

After the backing sheet has been coated with the effect base lacquer and optionally with the clear lacquer, the coated sheet is applied to a plastic moulded body.

In the course of this procedure, the sheet is stretched according to the invention in such a way that both plastic flow and elastic deformation occur, and so that deformation due to liquefaction does not occur in any event, since the homogeneous arrangement of the effect pigments would thereby be disturbed and streak-like phenomena would occur.

The uncoated underside of the sheet can be provided with a pressure-sensitive adhesive layer, so that good adhesion between the sheet and the plastic molded body is obtained.

The materials which are customary for the adhesive bonding of plastics may be used as adhesive materials. An example of a suitable adhesive is Herberts adhesive 9524 with hardener 507, a commercial product manufactured by Herberts GmbH.

The method according to the invention makes it possible to apply the effect coated sheet to sharply contoured plastics substrates. The effect base lacquer according to the invention which is used for coating the sheet is distinguished by a high degree of gloss, a good colour effect and by a good surface quality.

This can be effected without adversely affecting the lacquer surface, particularly when stretching of the sheet, and thus of the coating also, occurs due to its application to sharply contoured plastic molded bodies, e.g. those with pronounced edges. Even sharp bends round bending radii of 300 mm or less are possible with the sheet coated according to the invention, without cracks and visually impairing stretching zones occurring on the lacquer surface.

The following examples serve to explain the invention in more detail:

EXAMPLE 1

Preparation of a dispersion of non-rigid polyurethane 769 g of a linear polyester (synthesised from adipic acid and 1,6-hexanediol, and with a hydroxyl number of 75) were heated with 80 g N-methylpyrrolidone to 70° C. in a 4 liter reaction vessel fitted with a stirrer, an internal thermometer, a heater and a reflux condenser, and 61.3 g dimethylolpropionic acid were added at this temperature. The batch was heated to 120° C. and was stirred for half an hour at this temperature. 204 g hexamethylene diisocyanate were subsequently added after cooling to 70° C. The batch was stirred until the exothermic reaction had subsided, and was then held at 75° C. until the residual isocyanate number was about 1.9%. The hot resin mixture was then dispersed in a mixture of 1700 g deionised water and 34.7 g triethylamine with vigorous stirring. 5 minutes after the completion of the resin addition, a mixture of 17 g propylene-1,3-diamine in 135 g deionised water was added and the batch was stirred for a further hour. A slightly turbid, thin, aqueous dispersion was obtained, which had the following characteristic properties:

| | |
|---|---|
| solids content: | about 35% by weight |
| acid number: | 25 (mg KOH/g solid resin) |
| pH: | 7.8 |

EXAMPLE 2
Production of an effect lacquer according to the invention:

300parts by weight of the PU dispersion described in Example 1 were placed in a stainless steel stirred vessel and mixed, with stirring, with a mixture which had previously been prepared from 50 parts by weight of the effect pigment preparation HYDROLAC WH22NL (a registered trademark for a commercial product manufactured by Eckart a water based lacquer pigment preparation containing metallic flakes) and 50 parts by weight of butyl glycol. 40 parts by weight of the melamine resin solution CYMEL 325 ( a registered trademark for a commercial product manufactured by Cyanamid a melamine resin) were added with stirring.

A further mixture comprising 22 parts by weight of butyl glycol, 22 parts by weight of water and 22 parts by weight of the thickener VISCALEX HV 30 ( a registered trademark for a commercial product manufactured by Allied Colloids a polyocrylate thickener) were added with stirring, and the pH was adjusted to 7.5 to 8 with dimethylethanolamine. The product was subsequently adjusted to a run-out time of 35 seconds in a DIN flow cup.

EXAMPLE 3
Coating a thermoforming sheet:

The blue flame of a Bunsen burner was passed in overlapping tracks at a speed of about 300 mm/second over a HOSTAPROP polypropylene sheet (HOSTAPROP is a registered trademark for a commercial product manufactured by Hoechst). A 5% solution in xylene of a chlorinated polyolefine Type 343-1, manufactured by Eastman, was then poured on, allowed to run off in a vertical position and dried for 10 minutes at room temperature. The sheet which was primed in this manner was coated with the effect lacquer according to Example 2 by means of a cup gun, to give a layer thickness of 15 µm (with respect to the dry film), and was dried for 5 minutes at 60° C. An elastic clear lacquer— commercial product R 47891 —was subsequently sprayed on to give a layer thickness of 25 µm (with respect to the dry film), and was dried for 5 minutes at 23° C. and thereafter for 45 minutes at 80° C.

EXAMPLE 4
Testing the sheet for dilatability:

The sheet produced according to Example 3 was placed in a forming apparatus consisting of two metal rings with an inside diameter of 50 mm so that it was firmly clamped between the rings. A spherical cap (a hemisphere of diameter 20 mm) was then pressed against the back of the clamped sheet and the latter was correspondingly deformed until the vertex protruded by 10 mm from the original plane of the sheet. The spherical cap was then withdrawn over 30 seconds. In the deformed region, the effect lacquer surface was of similar uniform appearance compared with the undeformed region, and exhibited no cracks. After the loading had been released for 10 minutes, the permanent deformation was measured. The vertex of the deformed zone protruded by less than 8 mm from the plane of the undeformed region, which was proof of the partially elastic character of the deformation.

EXAMPLE 5
Application of the sheet to a profiled molding.

An oxidising gas flame was passed uniformly over the uncoated side of the sheet coated according to Example 3. A mixture of Herberts laminating adhesive 9524 and 5% by weight of the associated hardener 505 was subsequently applied using a lacquer spray gun. The sheet which was prepared in this manner was applied under pressure to an automobile side guard strip made of BAYFLEX 110 product, a polyurethane reaction injection molding and containing 20% glass fibres (commercially available for repair purposes), which was heated to 100° C., and was left in this position for 10 minutes in a circulating air oven at a temperature of 75° C. After cooling, the ends, which can be provided with end caps, were cut off. The remaining profile had an appearance corresponding to a uniform metallic coating.

Comparative example
Coating a sheet with commercially available lacquers:

The procedure was as in Example 3, except that a commercially available "STARSILBER" base lacquer of the "STANDOX AUTOLACKE" brand and a "2K-STANDOCRYL" two-component (registered trademarks for commercially available clear lacquer formulations) clear lacquer of the same brand were used instead of the base lacquer produced according to Example 2.

Testing of the sheet from the comparative example for deformability:

The procedure was as in Example 4, except that the sheet corresponding to the comparative example was used instead of the sheet coated according to Example 3. Cracks in the lacquer occurred during deformation here, even when the vertex of the elevation protruded by less than 3 mm from the plane of the sheet. On further deformation, cracks were formed throughout the entire sheet.

EXAMPLE 6
Foaming with polyurethane reaction molding material behind the lacquer-coated sheet:

A thermoforming sheet, which had been pre-coated analogously to Example 3, and over the uncoated side of which an oxidising gas flame had additionally been passed, was heated to 150° C. in a circulating air oven.

A test mold, which consisted of a cylinder of volume 1026 ml, which was provided with a flange, and a further cylinder of volume 410 ml, which had a plurality of holes at the edge of its cylindrical surface and had a slight conicity, was prepared by coating the latter mold part with a commercially available release agent and coating the inside of the first mold part with a layer of stearin wax.

650 g of BAYFLEX 70 and 440 g of DESMODUR products PA 100 (both these components are commercial products of Bayer AG), the marks being registered trademarks the BAYFLEX product being a polyurethane reaction injection molding and the DESMODUR product being an isocyanate cross-linker which had previously been mixed with each other, were placed therein, and were allowed to react with each other, in such a way that as soon as indications of an increase in volume were observed, the preheated sheet was placed on the cylinder opening, the second cylinder was fixedly attached to the first via the flange, and the apparatus was rotated.

After opening the apparatus it was seen that the sheet had become placed against the cylindrical mold wall with dilatation, and that the resulting cavity was tightly filled with polyurethane foam. Despite the dilatation, the surface of the coated sheet was of uniform appearance corresponding to a metallic coating.

EXAMPLE 7

An effect lacquer was prepared analogously to Example 2, except that 350 g of the dispersion according to Example 1 were used instead of 300 parts by weight, and 30 parts by weight of CYMEL 320 (CYMEL 320 is a registered trademark of Cyanamid Corp. the CYMEL product is a melamine resin) were used instead of 40 parts by weight.

A thermoforming sheet was coated with this effect lacquer analogously to Example 3, except that the sheet consisted of HIFAX CA 10A product (a registered trademark for a commercial product of Montell GmbH, Bayreuth a polypropylene plastic instead of Hostaprop.

The sheet exhibited a permanent deformation of about 6.5 mm in a test according to Example 4.

The coated sheet was heated to 90° C. in a circulating air oven. A cylindrical test mold which could be evacuated was prepared. This had a diameter of 100 mm and a depth of 50 mm, and had an open end with an external flange and a closed end with a vacuum suction opening. The preheated sheet was placed on one cylinder opening and securely fixed by a flange ring. The cylinder was then immediately evacuated by means of a vacuum pump until the sheet had become seated against the suction opening. After cooling the sheet to 30° C., the apparatus was aerated. The sheet had undergone a permanent cylindrical deformation and was of uniform appearance on its coated side, corresponding to a metallic coating.

What is claimed is:

1. A lacquer coated polymer sheet comprising an at least partially thermoplastic backing sheet coated with an elastic-plastic lacquer, the lacquer being formed from a lacquer mixture comprising ingredients 1–5; wherein, ingredient 1 is 0.1 to 10% by weight of lamellar aluminum or mica pigment, or a mixture thereof, ingredient 2 is 0 to 15% by weight of coloring pigment, ingredient 3 is 0 to 15% by weight of organic solvent, ingredient 4 is 50 to 76.9% by weight of water, and ingredient 5 is 18 to 45% by weight of a binder vehicle formed of components A–D;

component A is 10 to 70% by weight of an elastic polyurethane resin, component B is 5 to 40% by weight of a melamine resin, component C is 0 to 60% by weight of a further binder resin, and component D is 0 to 6% by weight thickener;

the weight percentages of ingredients 1–5 are relative to the total weight of the lacquer mixture, and the weight percentages of components A–D are relative to the total weight of the binder vehicle in the lacquer mixture; and, the ratio of the total wt. % of the elastic binder resins of components A and C to the total wt. % of the melamine binder resin of component B is adjusted so that a cupping test at room temperature of the lacquer coating polymer sheet according to DIN-ISO 1520 provides a 20 to 50% elastic deformation and 80 to 45% plastic deformation.

2. A lacquer coated polymer sheet according to claim 1 wherein component D is an acrylic resin or a polyvinyl alcohol.

3. A lacquer coated polymer sheet according to claim 2 wherein component D is 0.1 to 3% by weight relative to the total weight of binder vehicle.

4. A lacquer coated polymer sheet according to claim 1 which displays a loading deformation depth about 10 mm and a permanent deformation of depth 4.5 to 8 mm with a crack free coating following release of the loading when tested in the cupping test according to DIN-ISO 1520.

5. A method of applying a lacquer coated polymer sheet according to claim 1 to a molded substrate body comprising adhesively bonding the lacquer coated polymer sheet to the molded body with a permanent adhesive.

6. A method according to claim 5 comprising vacuum forming the lacquer coated polymer sheet onto the molded body.

7. A method of applying a lacquer coated polymer sheet according to claim 1 to a molded body, comprising:

fitting the lacquer coated polymer sheet into an injection mold, and backfilling the injection mold with a molding material.

* * * * *